United States Patent [19]

Mansell

[11] 4,428,650

[45] Jan. 31, 1984

[54] LINE FOCUS APERTURE FOR OPTICAL BEAMS

[75] Inventor: Dennis N. Mansell, Albuquerque, N. Mex.

[73] Assignee: United Technologies Corporation, Hartford, Conn.

[21] Appl. No.: 312,603

[22] Filed: Oct. 19, 1981

[51] Int. Cl.³ .............................................. G02B 5/00
[52] U.S. Cl. ............................ 350/319; 219/121 LP; 219/121 FS
[58] Field of Search ................ 350/319; 219/121 LP, 219/121 LQ, 121 LR, 121 FS, 121 LM, 121 LC-121 LG, 121 L

[56] References Cited

U.S. PATENT DOCUMENTS

| | | | |
|---|---|---|---|
| 3,286,193 | 11/1966 | Koester et al. | 219/121 LP |
| 3,474,219 | 10/1969 | Steigerwald et al. | 219/121 LD |
| 3,974,016 | 8/1976 | Bondybey et al. | 219/121 LD |
| 4,187,408 | 2/1980 | Heile | 219/121 LM |

*Primary Examiner*—Jon W. Henry
*Attorney, Agent, or Firm*—Eric W. Petraske

[57] ABSTRACT

An aperture useful for spatially filtering a line focus of an optical beam, such as that produced by a cylindrical mirror or lens, comprises a pair of rotating smoothly polished cylinders.

1 Claim, 2 Drawing Figures

LINE FOCUS APERTURE FOR OPTICAL BEAMS

DESCRIPTION

TECHNICAL FIELD

The field of the invention is that of an aperture for high-flux optical beams formed into a line focus.

BACKGROUND ART

In the art of high power lasers, it is often necessary to focus a high power beam through an aperture having a certain size, thereby blocking undesired optical flux passing along the beam direction at a distance greater than the aperture size. In the prior art, rectangular or triangular cross section apertures have been used, but these suffer from high heat loads caused by the high flux in the optical beams being limited. The high temperatures associated with large amounts of power in the optical beam can cause severe cooling problems for such devices.

DISCLOSURE OF INVENTION

The invention relates to an aperture for spatially limiting a high powered beam at a line focus, in which the side members of the aperture are a pair of highly polished rotating cylinders.

BEST MODE FOR CARRYING OUT THE INVENTION

Figure 2:
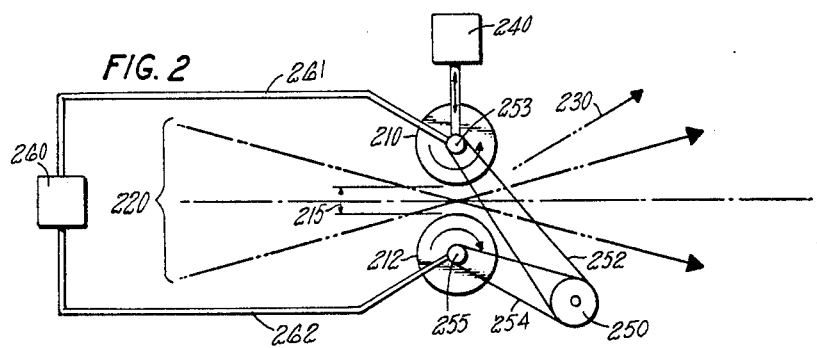
FIG. 2 illustrates an aperture constructed according to the invention.

FIG. 2 illustrates an optical aperture constructed according to the invention, in which beam 220 is focused to a line focus perpendicular to the plane of the paper by a cylindrical lens not shown converging to an aperture distance 215 and then diverging thereafter. Distance 215 is the distance between outer surfaces of cylinders 210 and 212 rotating about axes parallel to the axis of the line focus and also perpendicular to the plane of the paper. Radiation in beam 220 which is focused at the focal region a distance greater from the axis of the beam than is permitted by distance 215 will strike the outer surface of cylinders 210 and 212 at a grazing angle and be deflected thereafter outside the diverging beam, one such deflection being shown as direction 230 in the drawing.

The relative size of the cylinders forming the aperture and the angle formed by the diverging and converging beam is not critical. A pair of cylinders having a large radius will tend to approximate a flat surface for the sides of the aperture and a pair of small cylinders will tend to approximate the pointed edge shown in FIG. 1. In general, the larger the radius the more shallow the angle of scattering, and thus the lower the heat load on the surface, but higher heat loads can be compensated for by increasing the rate of rotation of the cylinders or by passing a coolant fluid through the cylinders.

Figure 1:
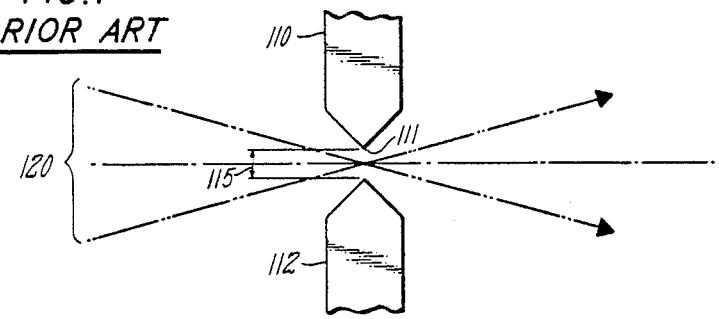
FIG. 1 illustrates a typical aperture of the prior art.

The cylinders may be rotated in either direction relative to the path of the beam, thus spreading out the heat load caused by scattering the beam over the entire cylinder surface instead of concentrating it in point 111 of the aperture as is characteristic of the prior art. In contrast, the prior art aperture shown in FIG. 1 is characterized by a point 111 at the boundary of the members 110 and 112 forming the aperture. The high heat flux being deposited on those members by the beam tends to concentrate at point 111, giving rise to a cooling problem that may be quite severe in high power lasers. An aperture having cylindrical members may be further improved by passing coolant fluids through the aperture, which may be confined to channels near the surface of the cylindrical member or may pass through the body of a hollow cylinder, as is convenient.

The size of the cylinders, the rate of rotation, and the amount of coolant fluid flowing through the cylinders will all depend upon the power to be dissipated and upon the degree to which the beam must be clipped and confined. Those skilled in the art will have no difficulty in tailoring an aperture to suit their requirements.

With all apertures, a portion of the optical flux that is to be removed from the beam will be scattered, the direction of scattering depending on the relative direction of the incoming flux and the surface of the clipping member. The embodiment of FIG. 2, with a high fraction of the deflected beam being deflected in a grazing angle, will tend to have the undesired radiation closer to the direction of the diverging beam than will the prior art device shown in FIG. 1. The use of relatively small cylinders will tend to increase the angle at which the scattered radiation emerges.

The cylinders may be polished to a high degree of finish by diamond turning and optical polishing techniques, thereby increasing the fraction of unwanted radiation which is deflected rather than being absorbed by cylinders 210 and 212.

The distance 215 between the cylinders 210 and 212 may be adjusted by incorporating conventional flexible driving means and coolant means so that the distance 215 may be readily adjusted. FIG. 2 illustrates schematically, i.e. through symbols and without conveying any spatial information, a method of rotating the cylinders with belts 252 and 254 turning shafts 253 and 255, respectively. Power is supplied by conventional source 250, represented symbolically be a circle. The spacing 215 may be adjusted by translating cylinder 210 parallel to its axis by any conventional means 240. Coolant fluid may enter one end of the shafts or centers of cylinder 210 and 212, travel perpendicular to the paper and exit the other end. Conventional means 260 is shown as being connected by flexible hoses 261 and 262. Rotating seals to contain the fluid on a shaft are well known in the art. All of the foregoing rotating, displacing and pumping means are well known in the art and no novelty is claimed for them.

I claim:

1. An apparatus for restricting the amount of radiation in a line focus of an optical beam comprising:

first and second cylindrical members, each having a polished outer surface and being disposed an equal separation distance on either side of and parallel to an aperture axis, whereby an aperture distance is defined as the shortest distance between said outer surfaces;

means for rotating said first and second cylindrical members about first and second rotation axes parallel to said aperture axis, respectively;

means for varying said aperture distance by changing said separation distance; and means for circulating coolant fluid through said first and second cylindrical members.

* * * * *